(12) United States Patent
Gruau et al.

(10) Patent No.: US 7,037,456 B2
(45) Date of Patent: May 2, 2006

(54) MANUFACTURING APPARATUS FOR FLEXIBLE PLASTIC TUBES

(75) Inventors: Bertrand Gruau, Braux Cohière (FR); Hervé Zakrzewski, Verdum (FR); Michel Bosshardt, Sainte Ménéhould (FR)

(73) Assignee: Cebal SA, Clichy (FR)

( * ) Notice: Subject to any disclaimer, the term of this patent is extended or adjusted under 35 U.S.C. 154(b) by 466 days.

(21) Appl. No.: 10/101,678

(22) Filed: Mar. 19, 2002

(65) Prior Publication Data

US 2002/0175445 A1 Nov. 28, 2002

Related U.S. Application Data

(60) Provisional application No. 60/355,614, filed on Feb. 6, 2002.

(30) Foreign Application Priority Data

Mar. 19, 2001 (FR) .................................. 01 03706

(51) Int. Cl.
*B29C 43/18* (2006.01)
*B29C 65/70* (2006.01)

(52) U.S. Cl. ....................... 264/248; 264/259; 264/268; 264/320; 156/244.11; 156/244.13; 156/245

(58) Field of Classification Search ................ 264/248, 264/259, 266, 268, 320, 325; 425/348 R, 425/350; 156/242, 245
See application file for complete search history.

(56) References Cited

U.S. PATENT DOCUMENTS 2,923,975 A * 2/1960 Voumard et al. ............ 425/393
3,078,517 A * 2/1963 Alexander ............... 425/126.1
3,313,875 A * 4/1967 Magerle ...................... 264/267
3,591,896 A 7/1971 Tartaglia ......................... 18/19
3,711,230 A * 1/1973 Magerle ................... 425/126.1
3,751,189 A * 8/1973 Magerle ...................... 425/258
3,896,710 A 7/1975 Holoubek et al. ........... 93/36.8
3,988,413 A * 10/1976 Gaudet et al. .............. 264/259
RE29,448 E 10/1977 Brown et al. .............. 156/73.5
4,310,366 A 1/1982 Van Manen ................. 156/69
4,314,799 A 2/1982 Amberg et al. ............. 425/296
4,352,775 A 10/1982 Maegerle .................... 264/500
4,664,284 A 5/1987 Mägerle ....................... 220/67

(Continued)

FOREIGN PATENT DOCUMENTS

WO WO10132404 10/2001

*Primary Examiner*—Melvin Mayes
(74) *Attorney, Agent, or Firm*—Ohlandt, Greeley, Ruggiero & Perle, L.L.P.

(57) ABSTRACT

Apparatus for manufacturing flexible tubes comprising a skirt and a head provided with a neck and a shoulder linking the neck to the skirt, the apparatus having a first zone devoted to manufacturing the skirts, a second zone devoted to manufacturing the flexible tubes, a third zone devoted to finishing the flexible tubes thus produced, a first transfer device transferring the skirts in continuous motion from the first zone to the second zone, and a second transfer device transferring, in continuous motion synchronized with the former, the tubes from the second zone to the third zone. The second zone has a third transfer device for transferring the punches in continuous motion synchronized with that of the first transfer device and with that of the second transfer device, loading device for loading the skirts on the punches associated with the synchronized movement of said first and third transfer devices, and unloading devices for freeing the punches from the tubes covering them for associated with the synchronized movement of the second and third transfer devices.

11 Claims, 10 Drawing Sheets

U.S. PATENT DOCUMENTS

| | | | |
|---|---|---|---|
| 4,735,761 A * | 4/1988 | Lindenberger | 264/511 |
| 4,834,638 A * | 5/1989 | Miyahara et al. | 425/116 |
| 4,931,006 A * | 6/1990 | Schwyn et al. | 425/112 |
| 5,211,798 A * | 5/1993 | Keller | 156/500 |
| 5,225,132 A | 7/1993 | Farina | 264/148 |
| 5,811,044 A * | 9/1998 | Rote et al. | 264/148 |
| 6,068,717 A | 5/2000 | Schwyn | 156/69 |
| 6,129,880 A * | 10/2000 | Kieras et al. | 264/230 |

* cited by examiner

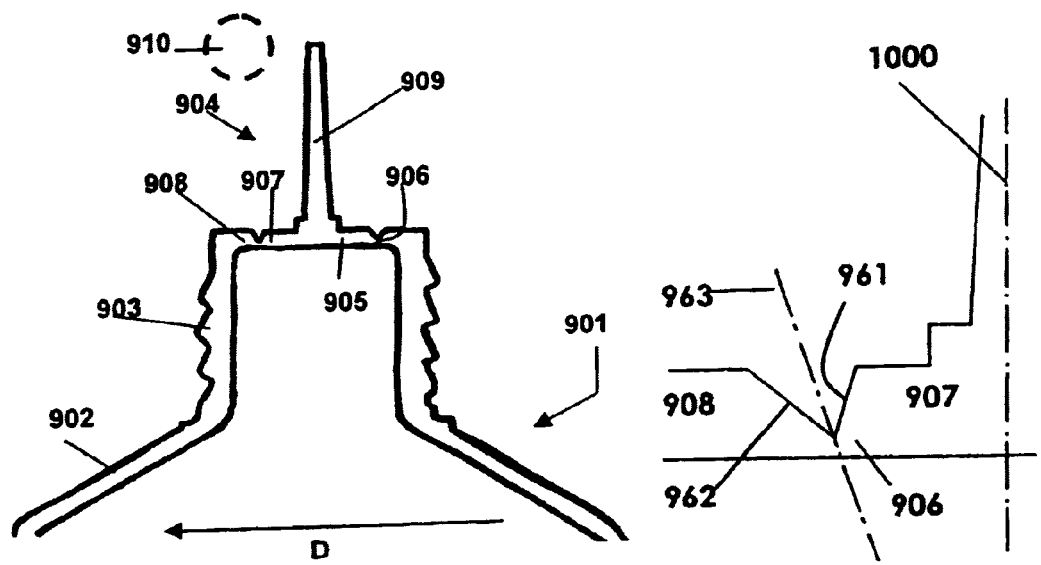
Fig. 9.1  Fig. 9.2
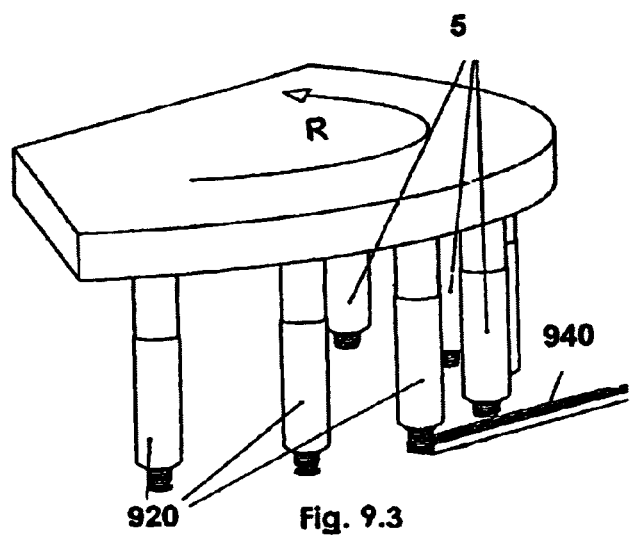
Fig. 9.3

MANUFACTURING APPARATUS FOR FLEXIBLE PLASTIC TUBES

This application claims the benefit of Provisional Application No. 60/355,614, filed Feb. 6, 2002.

FIELD OF THE INVENTION

The present invention relates to an apparatus for manufacturing flexible tubes intended for storing and distributing fluid products for paste products, such as cosmetic products, pharmaceuticals, hygiene goods or food products. The flexible tubes concerned have a head in plastic material(s) and a cylindrical skirt (asymmetric or not) comprising essentially one or several layers of plastic materials, possibly with a thin intermediate metallic layer.

BACKGROUND OF THE INVENTION

In general, a flexible tube is made by assembling together two parts manufactured separately: a flexible cylindrical skirt of given length (typically 3 to 5 times the diameter) and a head comprising a neck with a distribution orifice and a shoulder linking said neck to the cylindrical skirt. The head in plastic material(s) can be molded separately and then welded on one end of the skirt but it is advantageously molded and welded to the skirt in an autogenous way by using either an injection molding technique (FR 1 069 414) or a compression molding technique of an extruded preform (FR 1 324 471).

In these two techniques, the skirt is fixed around a punch, one of its ends extending slightly beyond the end of the punch, said punch end acting as the mould for producing the internal surface of the head of the tube (interior of the shoulder and the neck). In these two techniques, one uses a die, which comes up against the end of the punch, the cavity of this die defining the external surface of the shoulder and the neck. The main difference between these two processes resides in the fact that these tooling parts are first of all set firmly together before injection of the plastic material in the first case and that the movement of the tooling parts closing together results in the compression of an extruded preform in the second case.

In the two cases, the end of the skirt extending beyond the punch is caught in the cavity defined by the end of the punch and the cavity of the die. Under the effect of injection or under that of compression, the plastic material comes into contact with the end of the skirt and, raised to a temperature higher than their respective Vicat softening points, the plastic materials of the head and the skirt weld together intimately without any further input of heat or material. After a short maintenance under pressure (of the order of a few seconds) and then cooling, the head is molded according to the required dimensions and welded firmly to the skirt.

The above techniques, which appeared about fifty years ago for the first and about forty for the second, have been improved regularly. At present production rates can be achieved of about 200–250 units per minute. But it now seems that the limit has been reached and no further significant increase in the production rates (beyond 250–300 units per minute) can be reached by simple adaptation of the existing devices.

The applicant therefore tried to produce a new manufacturing apparatus for flexible tubes designed to obtain acceptable economic conditions for significantly higher production rates.

SUMMARY OF THE INVENTION

The summary of the present invention is a manufacturing apparatus (workshop) for producing flexible tubes comprising a skirt and a head provided with a neck and a shoulder linking said neck to said skirt, said apparatus comprising three distinct operational zones:

the first zone being devoted to manufacturing said skirts, typically comprising a device for shaping a long cylindrical sleeve such that the skirts are cut at the exit from the sleeve at the required length, the second zone being devoted to manufacturing the flexible tubes, comprising at least one device for manufacturing preforms in plastic material and several molding devices for the heads by compression of said preforms, each molding device comprising a die and a punch, each punch being provided before molding with one of said skirts such that, once molded, the head is welded onto said skirt.

the third zone being devoted to finishing the flexible tubes thus produced, said apparatus also comprising:

a first transfer means, transferring said skirts in continuous motion from said first zone to said second zone, and a second transfer means transferring, in continuous motion synchronized with the former, said tubes from said second zone to said third zone, said apparatus being characterized in that the second zone comprises a third transfer means for transferring the punches in continuous motion synchronized with that of the first transfer means and with that of the second transfer means and in that the second zone also comprises loading means, loading the skirts on the punches, associated with the synchronized motion of the first and third transfer means, and unloading means, freeing the punches from the tubes covering them, associated with the synchronized motion of the second and third means of transfer.

Typically, the first zone comprises a shaping device for a long cylindrical sleeve and means for cutting out the skirts in this sleeve. The cylindrical sleeve is "long", in the meaning that its length is significantly greater than that of the skirts. For example, it concerns an extruded or co-extruded plastic sleeve, the plastic material(s) being continuously fed by one or several screw extruder(s). It can also concern a sleeve produced by rolling and longitudinal welding of a strip comprising one or several layers in plastic material—and possibly with a thin intermediate metallic layer. The strip is rolled locally to place its lateral edges face to face and then said lateral edges are welded after being juxtaposed or set side by side. Thus a long cylindrical sleeve is obtained extending along the direction of its axis.

Next one makes a discontinuous cut from the end of the long cylindrical sleeve to obtain a skirt of the required length, preferably with the aid of one or several cutting tools. These cutting tools accompany the forward movement of the long cylindrical sleeve in such a way that they slice the wall of said long cylindrical sleeve in a plane remaining perpendicular to the axis of said long cylindrical sleeve. Once cut, the skirts remain in the axis of the long cylindrical sleeve and push each other, under the effect of the forward movement of said long sleeve, up to a place where they are picked up by the first transfer means.

The first means of transfer has individualized pickup means, typically rods intended to be fitted with the skirts, which move in continuous motion allowing them to arrive at the same place relative to the end of a new skirt each time the long cylindrical sleeve moves forward by a skirt length.

Said first transfer means transfers the skirts of the first zone in continuous motion to the second zone. It imposes on each skirt a movement such that the axis of the skirt is not tangent to the trajectory described by this movement. Preferably the axis of the skirt always remains substantially perpendicular to said trajectory. Preferably, also, in such a way that the skirt assembly remains in a position close to an average position, rods of diameter fairly close to the diameter of the skirt are chosen. Such rods will be called "loading mandrels" in the text below.

The second zone according to the invention is devoted to manufacturing flexible tubes. It comprises an area for loading the skirts on the punches, in which the loading means act between the first transfer means and the third transfer means, an area for manufacturing preforms in plastic material, an area for manufacturing tubes by welding the heads by compression on the ends of the skirts fitted around the punches, and an area for unloading the tubes thus produced, in which the unloading means act between the third transfer means and the second transfer means. The third transfer means transfers the punches into the area for loading the skirts, the area for manufacturing the tubes and the area for unloading the tubes. The description of these different areas is given below.

The second transfer means transfers the tubes in continuous motion from the second zone to the third zone. It imparts to each tube a movement such that the axis of said tube is not tangent to the trajectory. Preferably the axis of said tube always remains substantially perpendicular to said trajectory. Typically, this second transfer means can be a continuous chain of cups. The cups are hollow receptacles intended to receive the tube, their cylindrical cavity having a diameter slightly greater than that of the tubes. Said cylindrical cavity is generally provided with vented channels in which air can be circulated either by aspiration to maintain the tube co-axial with said cavity or by blowing to eject said tubes.

The second transfer means is so-called synchronized with the first transfer means in the sense that it makes it possible to feed a flow of tubes leaving the second zone identical to the flow of skirts entering the second zone. In this way, there is neither accumulation nor lack of the batch of skirts (and thus tubes) passing through the second zone. In order to give certain flexibility to the rhythm of the apparatus, the first and second transfer means are also provided with accumulation means making it possible to continue temporarily (several minutes or more) an upstream operation when a downstream operation cannot be carried out.

The movement of the first transfer means, the movement of the second transfer means and the movement of the third transfer means are called "continuous motion" in the sense that, at no moment, particularly during the loading of the skirts, during the compression of the head and during the unloading of the tubes, do the skirts or tubes remain immobile. Preferably, the movement of the matrices is also continuous and follows the general movement imposed by the third transfer means.

The third zone is devoted to the finishing of the tubes. Generally, there remain a certain number of complementary operations to be carried out on the tube, once the head has been molded on the end of the skirt. These operations can be: fixation of a stopper capsule, printing of the skirt, deposit of external varnish etc. The finishing work-posts can be grouped in devices (for example stoppers) which are fed with tubes by the second transfer means.

BRIEF DESCRIPTION OF THE DRAWINGS

In the preferred embodiments of the invention described below, the second zone is occupied by a device comprising the third transfer means, the latter actuating both the movement of the punches and that of the matrices. Said device is shown in FIGS. 1, 2, 3 and 11. FIGS. 9 to 11 show various means making it possible to obtain and place a preform in the gap of the molding tooling parts.

FIG. 4 shows details of the various elements intervening during compression of the head on the skirt. In this figure, as in the following figures, the skirt, the die and the tube produced are represented with a quarter removed so as to be able to illustrate the interior of the die, the rod of the perforation spindle and, also, the punch.

FIGS. 5 to 8 illustrate various stages of compression:

FIG. 5 shows the fitting of the skirt around the punch.

FIG. 6 shows the general tooling at the moment when the preform is deposited in the die.

FIG. 7 shows the beginning of compression.

FIG. 8 shows the tube obtained when it is ejected into a cup.

FIG. 9.1 shows the shape of the head of the tube obtained in example 2; once molded by compression, it does not have an orifice but a veil provided with a sectile region such that after tearing off said sectile region, one obtains an orifice defined by a clean edge without burrs.

FIG. 9.2 shows in detail a section through said sectile zone.

FIG. 9.3 shows other tubes with a head different from that illustrated in FIG. 9.1 and presenting a cap in the shape of a T, which is caught in a rail, non-tangent to its trajectory.

FIG. 10 shows the V shaped blade that also serves as receptacle as used in example 3.

FIG. 11 shows the transfer device used in example 3.

DETAILED DESCRIPTION OF THE INVENTION

Figure 1:
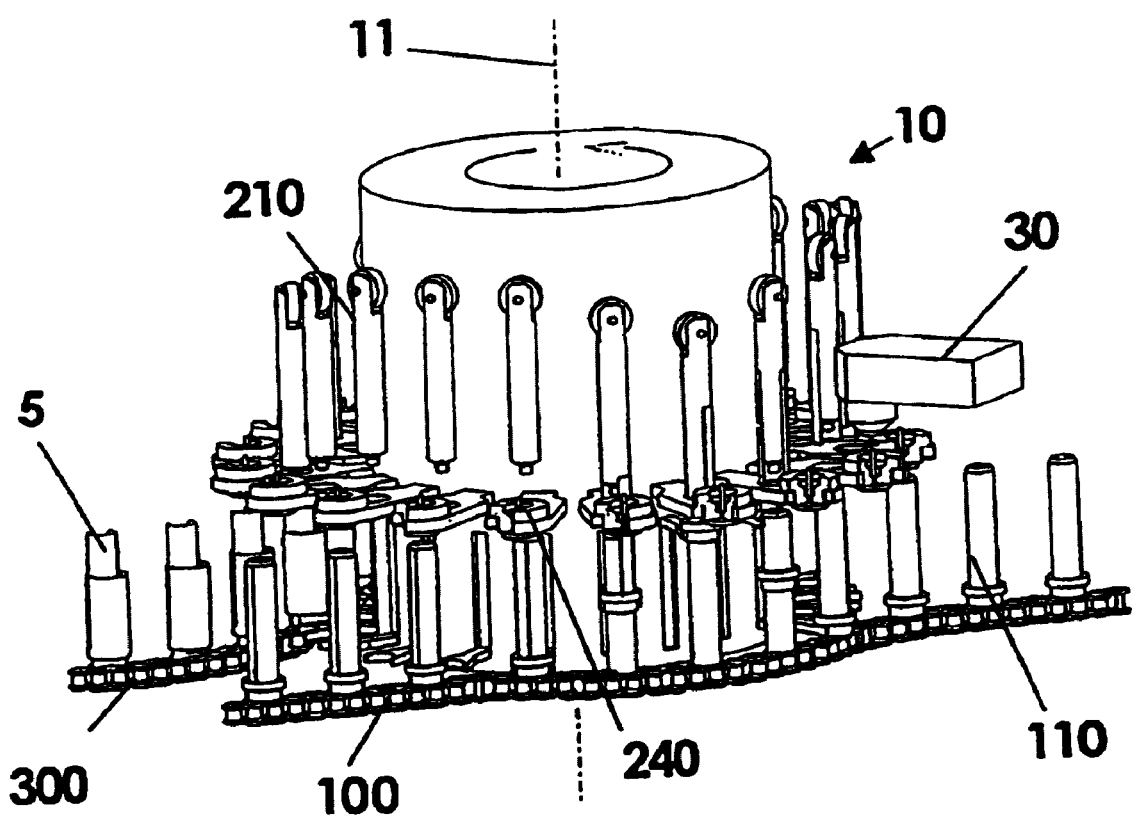
FIG. 1 shows a view in perspective of a rotary machine occupying the second zone of an apparatus according to the invention, with in the foreground a part of the supply chain for skirts entering, passing through and leaving the loading zone, and in the background part of a chain of cups provided with tubes leaving the unloading zone.

The second zone comprises a loading area in which loading means transfer the skirts in continuous motion so that they leave the first transfer means and fit around the punches actuated by the movement imposed by the third transfer means.

The synchronization of the continuous motion of the punches with that of the first transfer means of the skirts is such that, in said loading area, the punches and the skirts follow parallel trajectories while their axes coincide substantially. When they reach substantial coincidence, a loading means attached either to the first transfer means or to the third transfer means, exerts a relative movement of axial translation on a skirt in the direction of the punch in such a way that the skirt fits in the punch with little play by its first open end, said relative translation being stopped when said skirt is almost entirely fitted around the punch, one of its ends intended to be welded to the head, extending beyond the head of the punch. Preferably, this means of loading is attached to the third transfer means, which makes it possible to conserve a simple chain of loading punches—as means for transferring the skirts.

In the case when the operational time for molding is especially long (manufactures requiring several successive compressions, for example: production of multilayer heads or over-molding of a stopper), it is possible to organize several third transfer means which can each transfer a plurality of punches and bring them into a same loading area where several loading means can act simultaneously to feed the punches propelled by the different third transfer means with skirts from the first transfer means. Nonetheless, in the most frequent case, the time required for compression, maintenance under constraint and cooling of the head is sufficiently short for a single third transfer means to be sufficient.

In the manufacturing area for the tubes several devices for molding the heads circulate, actuated in continuous motion from the third transfer means. The number of these devices is defined in function of the rate required and the length of time needed for compression and cooling with maintenance under constraint of the molded part (of the order of several seconds, typically 5 seconds for normal geometry of the head of the flexible tube). These devices circulate in closed loop(s), which do not necessarily coincide: the punch loop and the die loop. In the manufacturing area, the punch and the die, thanks to the third transfer means, follow a general or global continuous motion synchronized with that of said first and second transfer means. This movement is called general since the punch and the die must move relative to each other, on the one hand to produce the compression, and on the other hand, at the end of compression, for the first de-molding phase which consists of separating the die from the punch remaining "covered" by the tube.

The punches are propelled by the third transfer means which makes them circulate in the area for loading the skirts, in the manufacturing area and in the unloading area in order to return to the loading area. The matrices have a movement imposed, at least in the manufacturing area, by the third transfer means which actuates the movement of the punches but they must also, outside the manufacturing zone, be sufficiently far from said punches to allow the setting of the preform in plastic material intended for the following compression. Preferably, in order to facilitate the alignment of the axes of the punches and those of the matrices, the matrices remain integral with the third transfer means even outside the manufacturing zone. The relative spacing of the punches and matrices is carried out following a direction perpendicular to the common direction of the punch and die axes and to the trajectory imposed by the third transfer axis.

In the manufacturing area, each of the molding devices comprises a die and a punch already equipped with a skirt, said skirt being then fitted around the punch, one of its ends extending slightly beyond the head of said punch. The die and the punch are aligned along their common axis and the gap is filled by the preform. The preform is a part in extruded thermoplastic material that is deposited either in the cavity of the die or on the end of the punch. The deposit is made either during the exit from extrusion—in this case the preform has a compact and preferably axisymmetric shape—or with the aid of another transfer means, that is to say a fourth transfer means transferring the preforms in continuous motion synchronized with the third transfer means or furthermore a fifth transfer means transferring the preforms in discontinuous motion, that is to say allowing them to be received in immobile receptacles which are then set in motion so as to be able to deposit the preforms in the gap of the molding device propelled by the third transfer means.

The head of the punch has a shape intended to define the internal surface of the tube head. The cavity of the die defines the external surface of the head.

In the manufacturing area, the punch is provided with the skirt, fitted around it up to a height such that the end of the skirt extends slightly beyond the head of the punch: typically 3 to 4 millimeters beyond the shoulder serving as base for the substantially truncated-cone shape of the head of the punch which defines the shape of the internal surface of the shoulder of the tube to be produced. In order that the skirt remains in this position until molding, the punch is provided with one or several elastic elements with radial displacement offering a cylindrical dimension whose diameter is, at rest, greater than that of the skirt.

When the punch and the die are aligned, when the gap between the head of the punch and the cavity of the die is filled up by the preform, whose temperature is in the region of or slightly above the operational temperature, the punch and the die are brought together, preferably by relative translation of one towards the other along their common axis. The relative translation means acting on the punch (respectively the die) is associated to the third transfer means and imposes a perpendicular translation to the trajectory of the die (respectively the punch).

Under the effect of this translation the preform is deformed and the flow of the plastic material is guided by the free surfaces of the residual gap which diminishes in volume progressively. When the punch and the die join together, they define a molding cavity where the end of the skirt is caught. The plastic material of the preform comes into contact with the end of the skirt. The plastic materials of the head and the skirt are welded together intimately without any addition of heat or material. They remain welded together after maintenance under slight pressure and after cooling.

Since the compression involves non-negligible effort, the molding tooling which does not undergo translation is preferably held by a support means along all the part of its run while the other molding tooling approaches and then remains integral.

The second zone also comprises an unloading area in which the unloading means transfer, in continuous motion, the tubes fitted round the punch, actuated by the movement imposed by the third transfer means, towards the second transfer means.

The synchronization of the continuous motion of the third transfer means with that of the second transfer means is such that, in the unloading area, the punches provided with tubes and the cups follow parallel trajectories while their axes come substantially into coincidence. When they substantially coincide, an unloading means attached either to the third transfer means or to the second transfer means, imposes a relative movement of axial translation to the tubes in the direction of the cup such that the tube is collected in the cavity of the cup. Preferably, this means of unloading is attached to the transfer means of the punches, which makes it possible to preserve a simple chain of cups as second transfer means.

The synchronization relies on the fact that the flow of tubes coming from the second zone is equal to the flow of skirts entering the second zone. In the case where the molding operations are particularly long, there is nothing against organizing several third transfer means which could each transfer a plurality of punches and would bring these into a same unloading area where several unloading means would act simultaneously to strip each loop from each punch and to feed the second transfer means with tubes coming from the various third transfer means.

When they are attached to the third transfer means, the loading means and the unloading means can coincide as means capable of producing relative translation in the two directions, thus fulfilling the two functions. However, preferably, since the skirts are very flexible and difficult to manipulate by their cylindrical wall, two different methods are used: the first is for example a pushing finger (or fork), pushing one end of the skirt towards the punch and the second can quite simply comprise a channel made in the punch, opening at one or two places of the head of the punch and through which a jet of compressed air is passed. Excess pressure acts on the internal face of the head of the tube, sufficient for detaching said tube head from the head of the punch and then ejecting the tube axially in the direction of the cup.

The second zone also comprises the area for manufacturing the preforms. This is not necessarily concerned by the continuous motion imposed according to the invention by the third transfer means. The preforms can, for example, be obtained "statically" by extrusion and then taken away and deposited as a die or a punch passes. However, to facilitate compression of the head, it is often advantageous to start from a preform, which is already axisymmetric. Thus, a preform with a toric shape makes it possible to fill the cavity for molding the head with more regularity. It is preferable to try to keep the shape of such a preform until the latter is placed in the die cavity or on the punch head, around the protuberance defining the internal surface of the neck. This can prove to be difficult if one takes samples at high speed and in this case one tries to deposit them in the gap of the molding tooling parts following a continuous motion synchronized with that of the third transfer means, either by carrying out the extrusion with means propelled by a fourth transfer means synchronized with the third transfer means or by carrying out the extrusion "statically" and then using a fifth transfer means to transfer the preforms thus extruded, in a discontinuous movement, through the intermediary of receptacles receiving the extrudates statically and then set in motion so as to be able to deposit the preforms in the gap of the molding device propelled by the third transfer means.

In the first case, the extruded preform emerges from the immobile extrusion die fed by a fixed extruder (fixed, in the meaning that only the extrusion screw turns around its axis). It is, for example, deposited in the cavity of the die, while the latter, propelled by the third transfer means, is moving near the exit of the die to collect the preform as it passes. In a simple embodiment, the extruded preform emerges horizontally continuously and a scraper finger located above the passing die comes to shear the extrudate, which falls by gravity into the cavity of the die. The speed of passage of the matrices—and the scraper fingers associated—and the speed of extrusion of the extrudate in thermoplastic material are defined such that the preform obtained by shearing the extrudate has the required quantity of thermoplastic material making it possible, with good precision, to fill the volume of the molding cavity (manufacturing tolerance must generally be lower than 5%).

One can also modify the exit from the die in such a way that the extrudate emerges vertically and by using a slide gate valve freeing and then blocking the die exit. The sliding of the gate cuts the extrudate at the length required and the extrudate obtained falls into the cavity of the die, which is made to pass vertically beneath the exit from the die.

Starting from this preform, it is thus a matter of making a tube head comprising a shoulder—one end of which is welded in autogenous fashion to one end of the skirt—and a neck, the neck being provided with a distribution orifice. The production of the neck provided with its distribution orifice poses a certain number of problems when the molding is carried out by compression, problems which are made worse when one uses continuous motion tooling; either one uses as preform a large extruded nut and in this case it is very difficult to avoid the formation of a residual veil covering the orifice, or one uses a preform of toric shape which one fits around a central protuberance connected to the die or the punch.

If one uses a preform in the shape of a large nut, one obtains almost systematically a residual veil at the place of the orifice. Even if one provides a socket system, for example a protuberance of the punch arriving to engage in a cavity of the die, it is not possible to impose close adjustment and perfect alignment of the tooling parts, on the one hand because these conditions have little compatibility with tooling in movement and high manufacturing rates, and on the other hand because the pressure needed at the end of compression becomes redhibitory.

If one uses a toric preform, the problem is to produce the latter in the shape required and then to put it in place without deforming it too much in the gap comprised between the molding tooling parts.

A first solution consists of producing the toric preforms with the help of mobile extruders. Then, advantageously one uses a fourth transfer means for transferring the preforms extruded in continuous motion synchronized with the third transfer means. It can consist of a means of transfer comprising several extruders propelled by this fourth transfer means which locally imposes on them a trajectory parallel to that of the punches or that of the matrices intended to collect the preforms, the axis of extrusion coinciding substantially with the axis of the receiver tooling, over a length sufficient for the quantity of plastic material required to be extruded.

A second solution consists of producing the preforms with an immobile extruder. Then one uses one or several transfer means for transferring intermediate receptacles for collecting the extrudates, in continuous motion. This (or these) fourth means of transfer impose(s) a sufficiently slow movement to be able to collect the extrudates as they exit under good conditions, each receptacle of each fourth transfer means passing in front of the exit of an immobile extrusion die. With the aid of an immobile extruder one obtains a thick cylindrical extrudate which one then cuts at a height such that one obtains the quantity of material needed to form the head of the tube.

In a first variant of this solution, the extrudate is cut and then collected in a receptacle provided with a perforation spindle whose end skims past the die, and which moves relative to said die such that the time necessary for crossing the internal diameter of the central hole of the toric preform corresponds to the length of time of extrusion thus making it possible to obtain the quantity of plastic material necessary.

In a second, preferred, variant of this solution, the cutting is carried out when running with the aid of a blade of a particular shape, integral with the fourth means of transfer. Typically, this blade has the shape of a V, which enables it to cut the extrudate, while still obtaining a toric preform with little deformation. This blade also acts as receptacle after cutting the extrudate and collects the toric preform thus obtained for the time needed for it to be transferred towards the compression molding tooling.

This or these fourth means of transfer then transfer in a continuous movement the intermediate receptacles which collect the extruded preforms in a continuous motion synchronized with the third transfer means and one proceeds with setting them, by gravity and possibly with the aid of an air jet, in the gap comprised between the molding tooling parts, that is to say in the cavity of the die or around a central protuberance of the punch. A particularly simple and efficient embodiment of this variant is described in example 3.

Another variant of this second solution consists of also using a fifth transfer means transferring, in a discontinuous movement, the intermediate receptacles at a complete stop for collecting the preforms at the exit from an immobile extruder and then being put into motion to deposit the preforms in the gap comprised between the molding tooling parts propelled by the third transfer means. Such means can, for example, be a chain of cups associated with an accumulator.

A third solution consists of producing a simple nut by extrusion: one does not avoid the formation of a veil obstructing the orifice during compression. On the contrary, it is produced intentionally. In future, this veil will be called the "cap" because it closes the distribution orifice. This cap is given a specific shape, such that later it can easily be detached without needing a special cutting tool, to obtain a distribution orifice with neat and clean sides.

In this third solution, the punch and the die have cavities designed in such a way that the head thus molded has a neck whose upper extremity is surmounted by a cap which has at least one transversal side wall which comprises a sectile region (or tear zone) whose closed contour defines the required shape of the orifice and which is surrounded by two regions able to resist the mechanical effort needed for breaking said sectile region, one of them being intended to transmit said mechanical effort and the other to serve as support.

After molding, said cap is removed by applying a mechanical effort on a part of the cap. This part of the cap is separated from the sectile region by the region able to transmit said mechanical effort, the application of said mechanical effort thus having for consequence the rupture of the sectile region and the formation of the distribution orifice. A particularly simple and efficient embodiment, described in example 2, consists of giving the shape of an axial rod to one part of the cap. Once the die is released, the tube thus formed and provided with said cap is integral with the punch and moves in continuous motion thanks to the third means of transfer. It thus suffices to place a simple immobile finger across the trajectory of the end of the rod, locating it at a distance such that the sectile zone has cooled to a temperature slightly below the vitreous transition temperature when the head arrives at this position (only a few seconds are required). The end of the rod is thus immobilized by the finger whereas the base of the rod carries on in its continuous movement. A flexion force is thus imposed on the rod, which is transmitted to the transversal wall. Under the effect of this flexion, the sectile region breaks and the cap is ejected, following a precise and repeatable direction, outside the continuous movement manufacturing chain.

Another aim of the invention is a process of manufacturing flexible tubes comprising a skirt and a head provided with a neck and a shoulder linking said neck to said skirt, said process including the following stages:

a first stage in which skirts are driven by a continuous movement using a first transfer means a second stage in which said skirts are loaded using loading means onto punches associated with a third transfer means driven by a continuous movement synchronized with the first transfer means, one of the ends of the skirts extending slightly beyond the punches;

a third stage in which the flexible tubes are made by molding the head with autogenous welding onto one end of the skirt, the head being obtained by compression molding a preform, by moving relatively closer the punch fitted with the skirt and a die, said punch and said die defining when they are placed side by side a molding cavity in which the end of the skirt is trapped, said punch and said die being driven by a continuous overall movement associated with the third transfer means, said preform being deposited before compression in the gap between the punch and the die using a fourth transfer means driven by a continuous movement synchronized with the third transfer means;

a fourth stage in which said tubes are unloaded using unloading means onto a second transfer means driven by a continuous movement synchronized with the third transfer means.

The process is described here from the moment when the skirts are already made and up till the moment when the tubes are sent for finishing operations. The stages of the process according to the invention may obviously be enhanced by the preferred characteristics described above. The punches are said to be "associated" with the third transfer means in the sense that, like the dies, they are driven by an overall continuous movement corresponding to that of the third transfer means that they are also driven by a relative movement intended to bring them closer to or move them away from the die, or to load the skirts or again to unload the tubes.

It is also possible to conceive of a number of variants, for example using several elements already made and their assembly by compression molding an intermediate part and autogenous fusion or trapping of a part of these elements with the compression molded component: it is thus possible to provide the punch with an insert placed on its end, said insert being intended to cover the internal surface of the shoulder in order to increase the diffusion barrier at this point. Such inserts are for example described in U.S. Pat. No. 4,466,284 5 (KMK), EP 0 130 239 (AISA) or EP 0 724 897 (CEBAL S.A.) The head is compression molded as previously described. The molding cavity is designed in such a way that the insert is trapped at its ends by the plastic material of the compression molded head. There is obviously nothing to stop the punch from also being provided with the skirt, fitted around its cylindrical surface, and to stop there occurring, simultaneously with the trapping of the insert, an autogenous welding of the end of the skirt with the plastic material of the compression molded head.

Another variant consists in providing the punch with the skirt and with a head already molded but having an external diameter slightly smaller than that of the skirt, and in making the tube by compression molding a toric preform intended to make the only outer end of the shoulder, which constitutes the border zone between the head and the skirt, as shown in U.S. Pat. No. 6,068,717 (B.A. Schwyn). The plastic material of the head, the skirt and the toric preform are compatible in fusion and the ends of the head and the skirt are sufficiently thin for them to fuse in contact with the plastic material of the preform and to mix with them during compression molding of said preform.

Lastly, this process may be brought into widespread use in the manufacture of assemblies other than flexible tubes, namely assemblies of components made of plastic material(s) at least one component of which has a part which is welded autogenously to a last component during the molding of this last component or again, trapped by the plastic material of said last component. All that is required is to provide one and/or the other of the compression molding tooling parts driven by a continuous overall movement with components already made and some parts of which extend in such a way that when the molding tooling parts are placed side by side, they define a molding cavity in which these parts are trapped. The extending parts may be parts which are sufficiently thin for them to fuse on contact with the plastic material of the preform intended to make the last component and to mix with said plastic material during compression molding of said preform. But the extending parts may also be massive projecting parts, in the form of a dovetail or any other form of anchoring, in such a way that they remained trapped by the plastic material of the last piece after compression molding of the latter.

The different components of the assembly may be made in the same material or in materials which are compatible in fusion if autogenous welding is sought during compression molding. They may also be incompatible in fusion and in this case, a trapping of some parts of the components already made by the plastic material of the compression molded component will be sought.

A mere shaping operation of one of the assembly components, which is made of a polymeric material having adhesive properties, may also replace compression molding. Preferably this component is an intermediate component between two already molded components as the toric preform intended to constitute the border zone between the head and the skirt, as shown in U.S. Pat. No. 6,068,717. The shaping tooling parts are similar to the molding tooling parts described above. Feeding these tooling parts and positioning these components onto these tooling parts are also similar. As a polymeric material having adhesive properties, a polyolefin modified with butyl or butylene radicals can be chosen.

Provisional Application "Apparatus for Manufacturing Flexible Tubes," filed Feb. 6, 2002 (U.S. Provisional Application No. 60/355,614) and French Application No. 0103706, filed Mar. 19, 2001 are hereby incorporated by reference in their entirety.

EXAMPLE 1 (FIGS. 1 TO 8)

Figure 2:
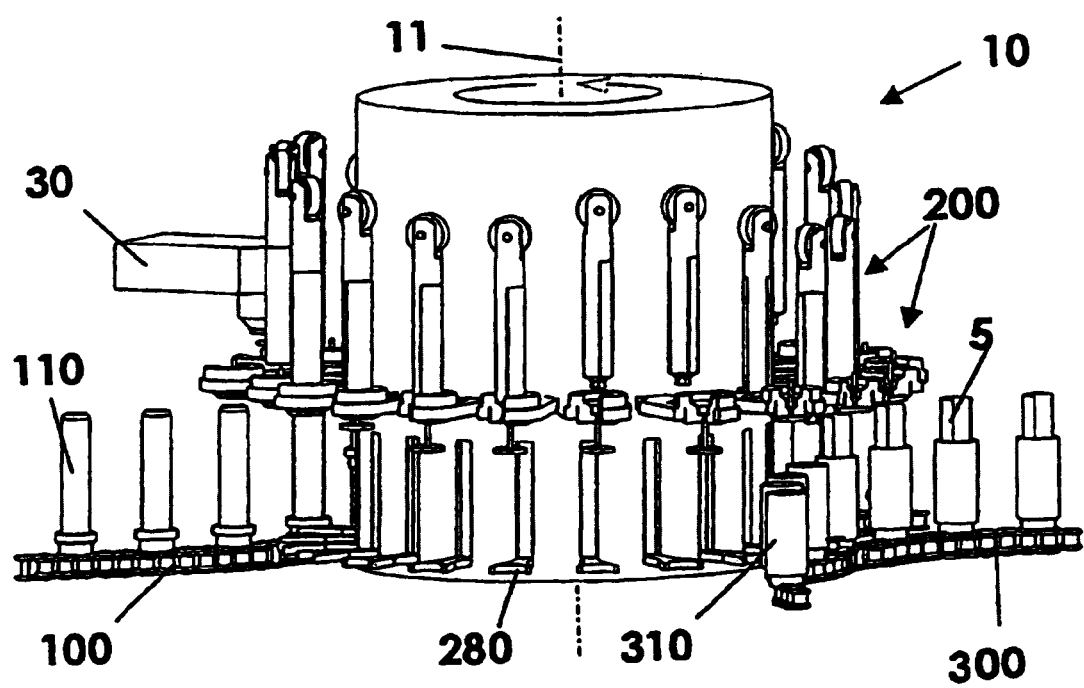
FIG. 2 shows a view in perspective of the rotary machine of FIG. 1, seen from a point almost diametrically opposite the observation point of FIG. 1, with on the left a part of the chain for feeding the skirts, on the right a part of the chain with cups collecting the tubes and, in the middle, the part of the rotary machine devoted to compression molding of the heads on the skirts.
Figure 3:
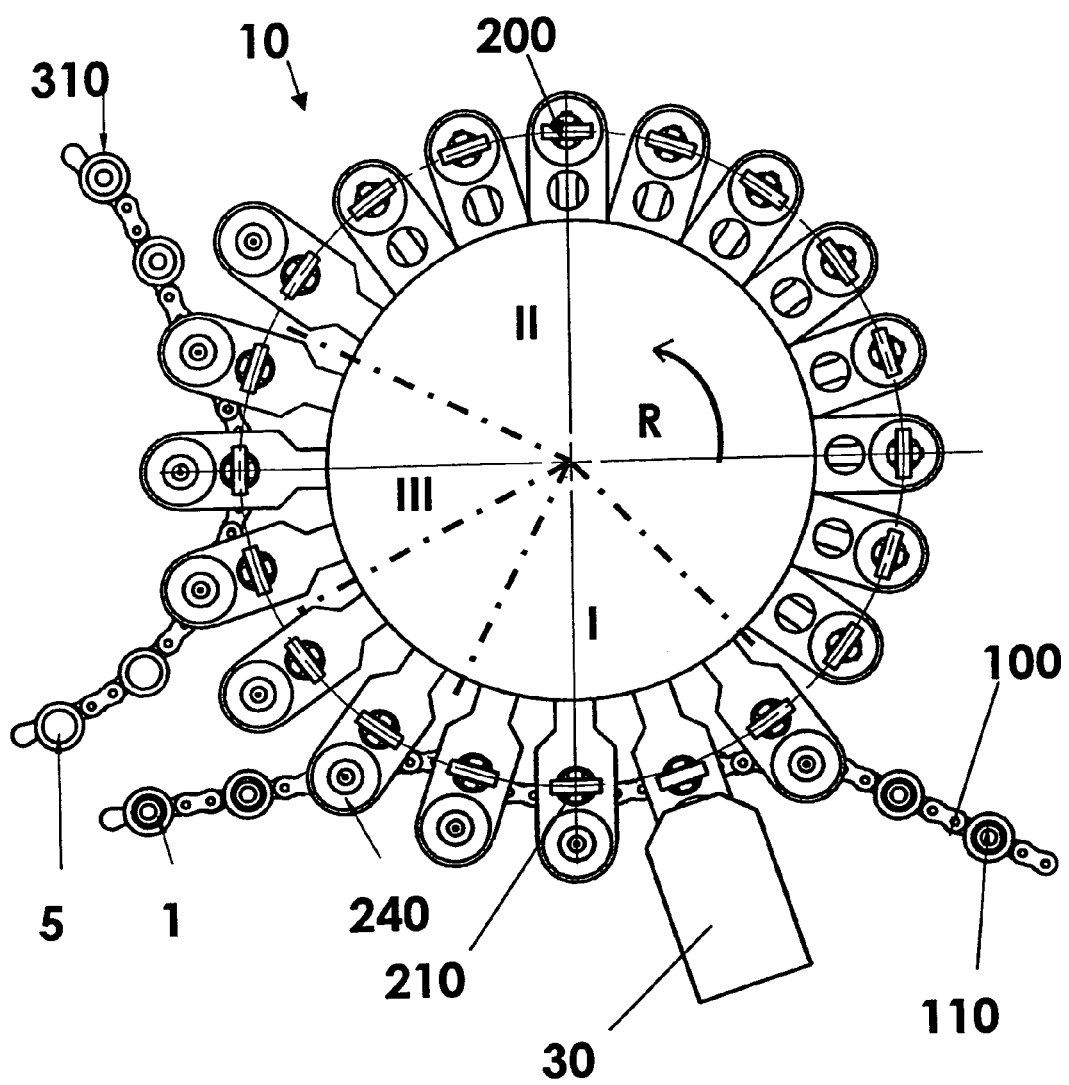
FIG. 3 shows a view from above of this same rotary machine, the chains for supplying the skirts and for transferring of the tubes.
Figure 4:
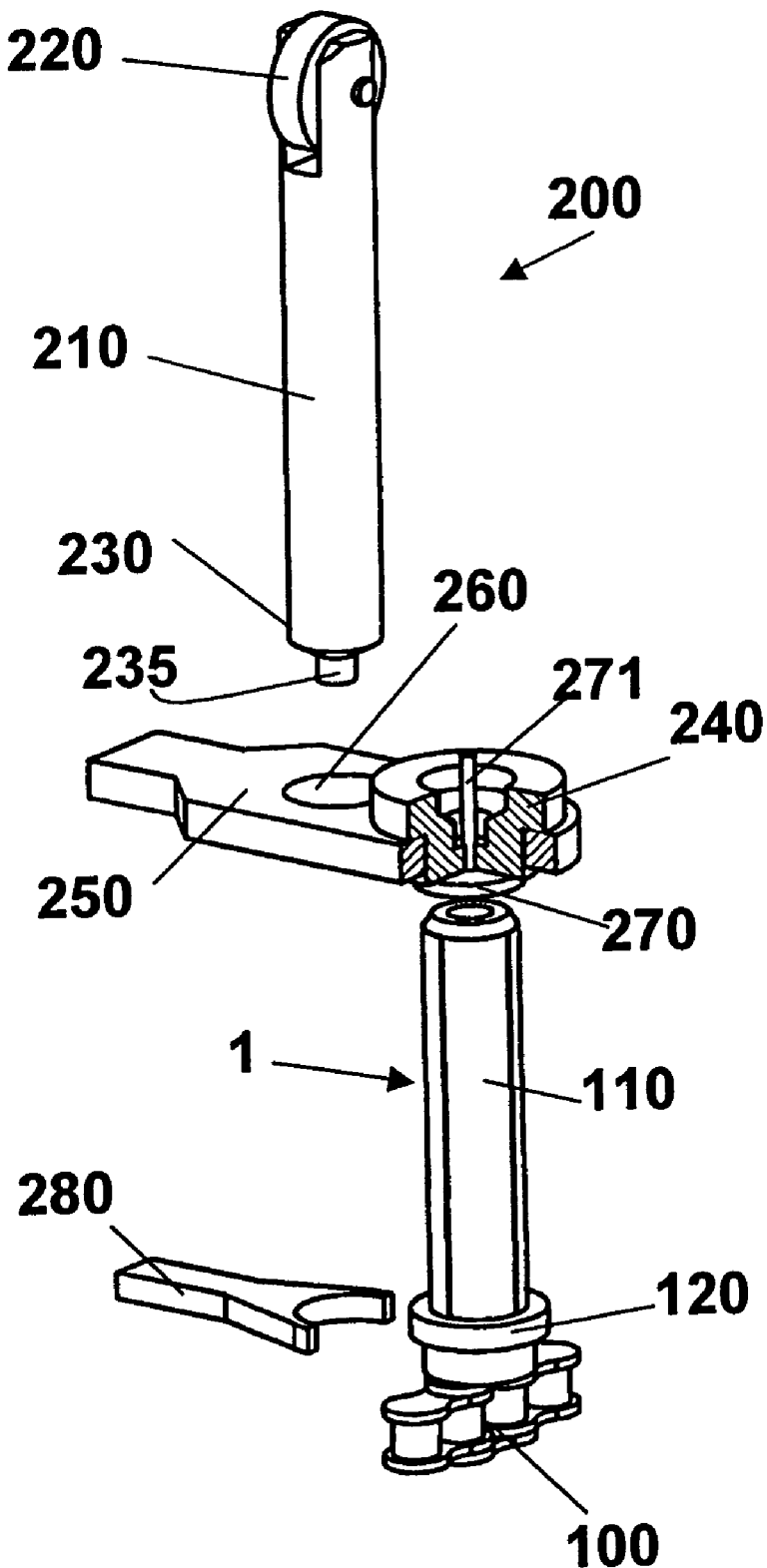
FIGS. 4 to 8 show the different stages of loading, compression, and unloading.
Figure 5:
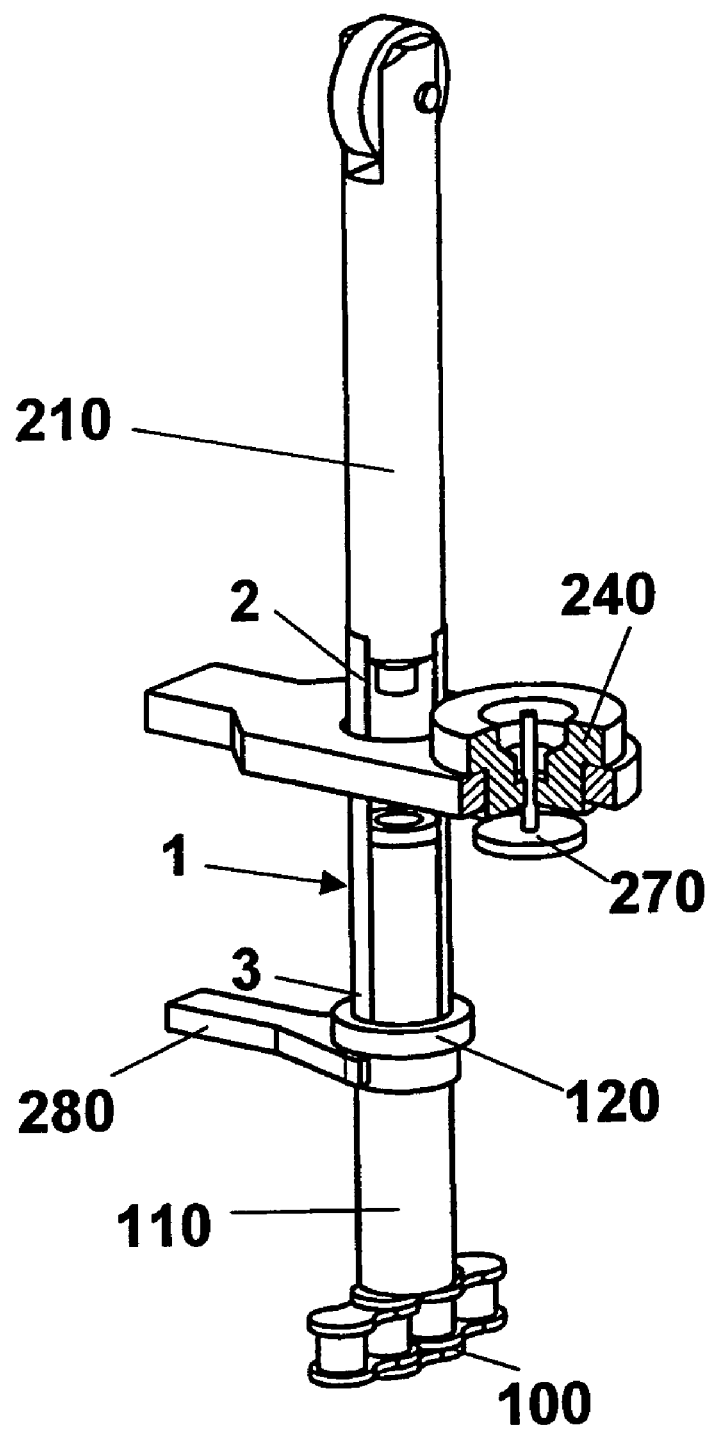
Figure 6:
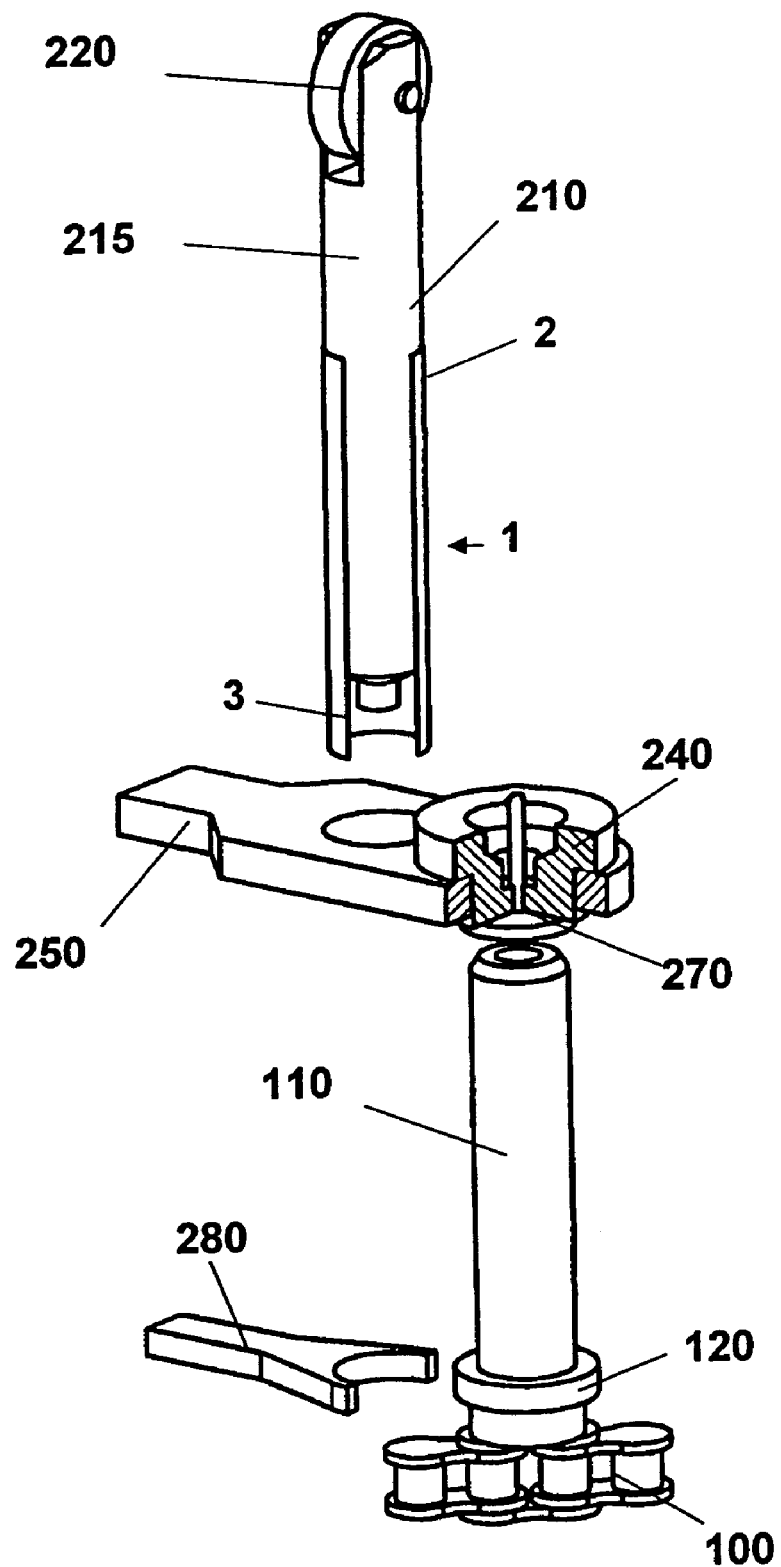
Figure 7:
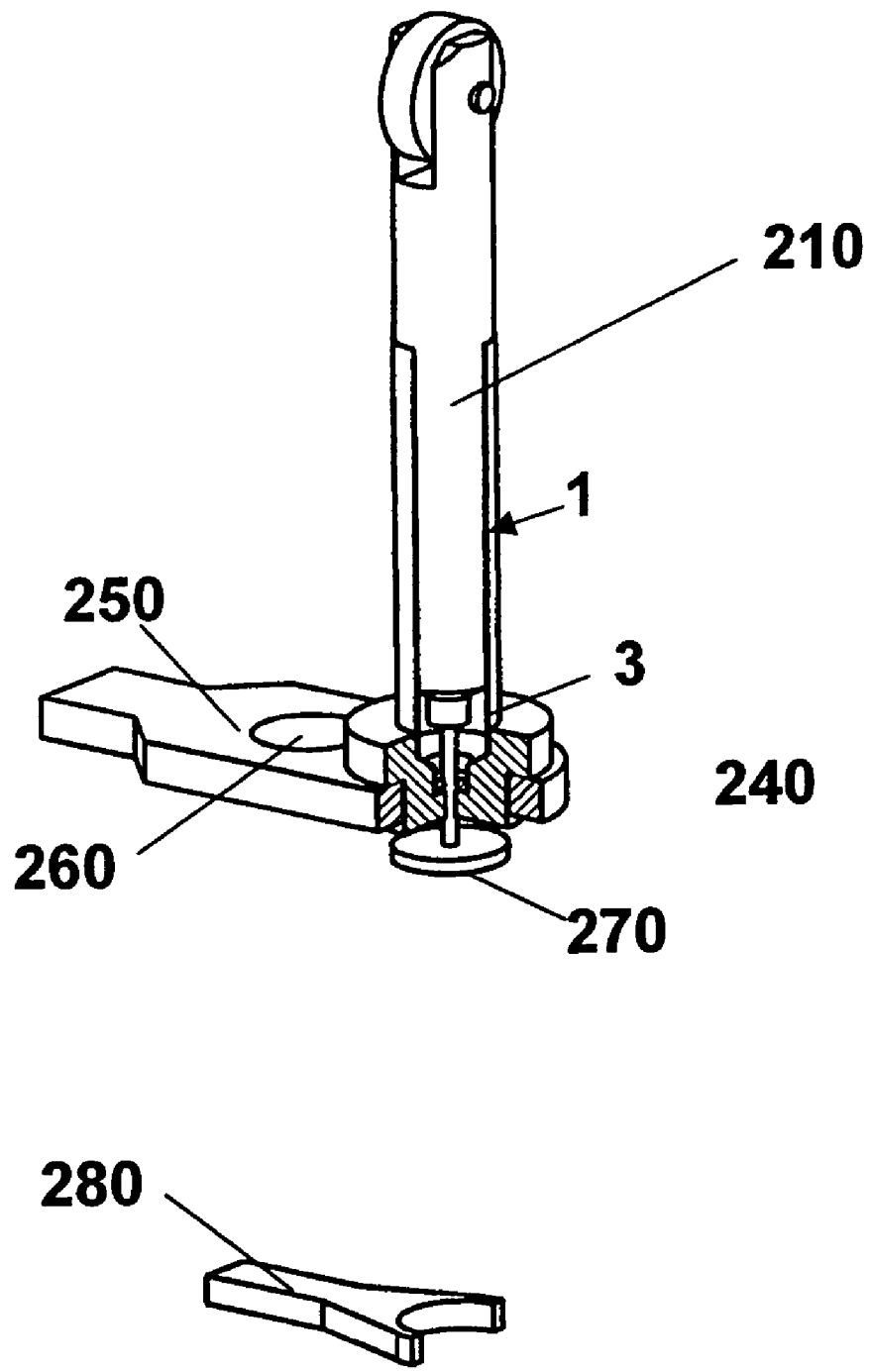
Figure 8:
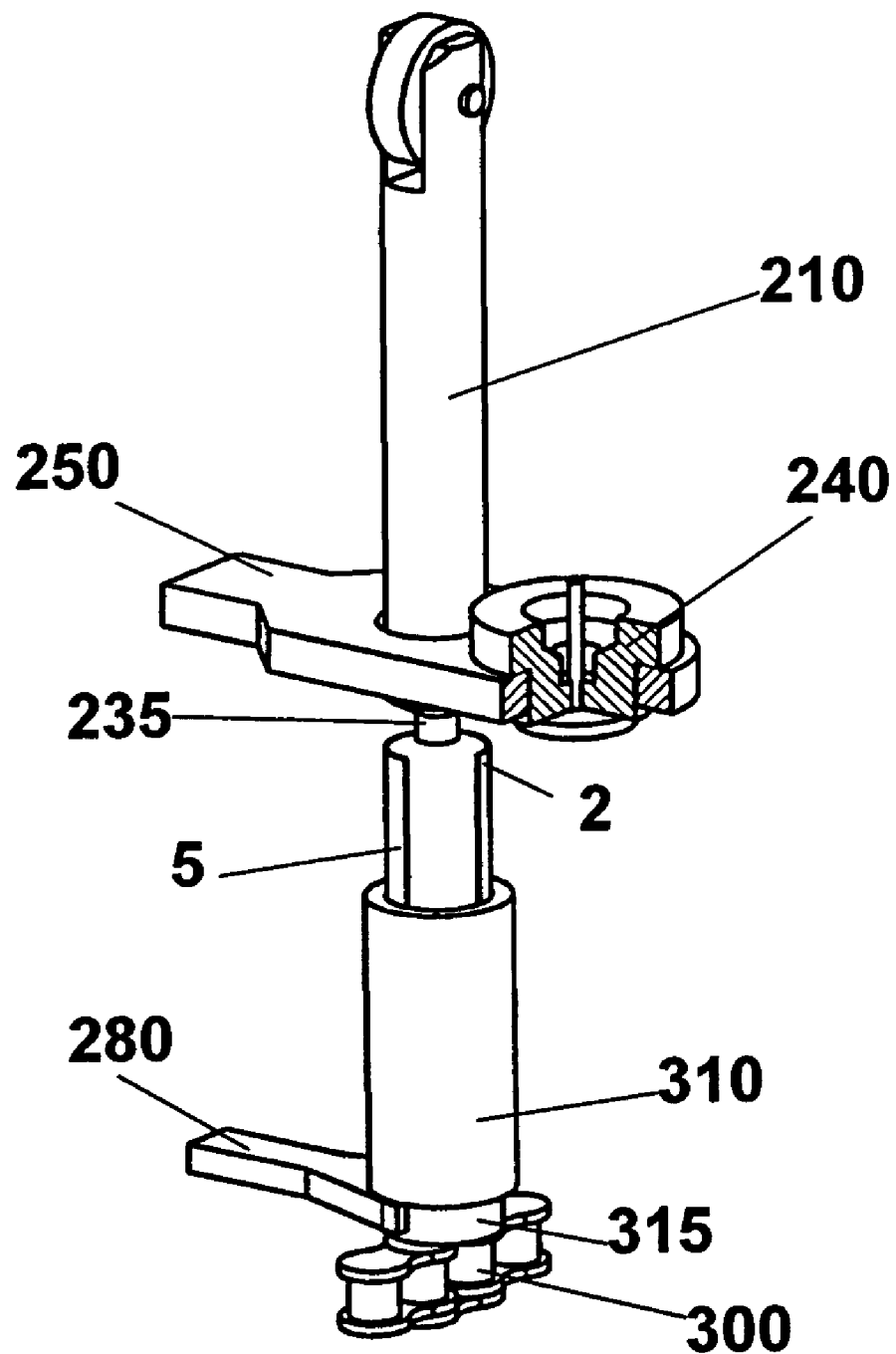
Figure 10:
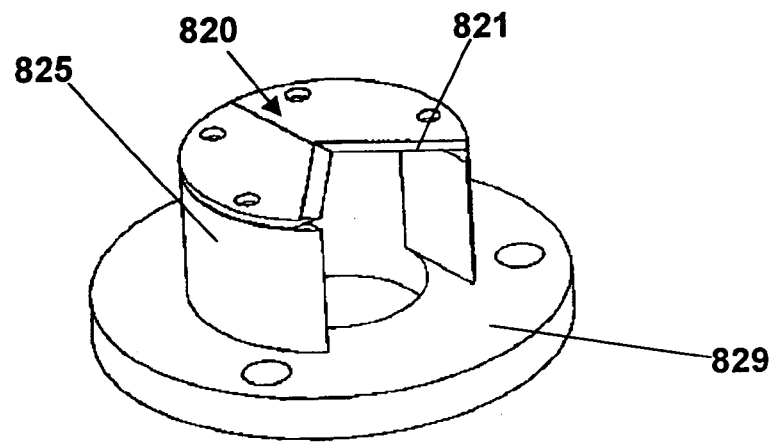
Figure 11:
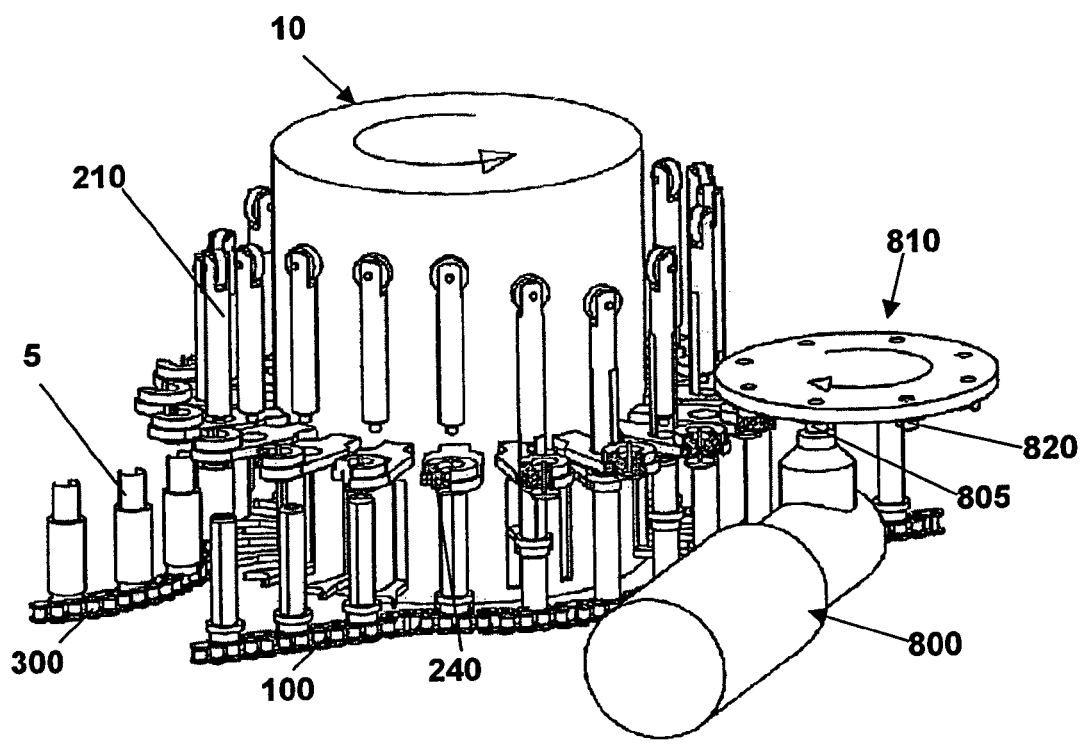

The apparatus comprises three distinct operational zones, whereas only the second is shown in FIGS. 1 to 3.

The first zone is devoted to the manufacture of the skirts 1. The long cylindrical sleeve, of diameter 30 mm, is produced by longitudinal welding of the rolled edges of a ribbon in multilayer structure with barrier effect PE.BD/PE.HD/EAA/EVOH/EAA/PE.BD which is supplied continuously. The ribbon is already printed and the skirts 1 are cut out as they pass, at the required length, 160 mm, respecting the position of the printed decor. They are then fitted around the loading mandrels 110 of the first transfer means 100 which is a chain of loading mandrels.

The second zone comprises a device for manufacturing the preforms 30 and a rotary machine 10 putting the whole of the molding devices 200 into continuous circular motion R, comprising the mandrels 210 and the matrices 240 plus the loading means 280 and the unloading means.

The third zone is occupied by a stopper installation.

The first transfer means 100 is a chain of loading mandrels 110. It transfers the skirts 1 in continuous motion from the first zone to the second zone.

The second transfer means 300 is a chain of cups 310. In continuous motion it transfers the tubes 5 from the second zone to the third zone.

The second zone comprises a third transfer means: the rotary machine 10 which transfers the punches 210 in a continuous motion synchronized with that of the chain of mandrels 100 and with that of the chain of cups 300. The second zone also comprises loading means 280, loading the skirts 1 on the punches 210, associated with the synchronized movement of the rotary machine 10 and the chain of loading mandrels 100, and unloading means, freeing the punches from the tubes 5 covering them, associated with the synchronized movement of the rotary machine and the chain of cups 300.

The rotary machine 10 turns around a vertical axis 11 and comprises a certain number of molding devices 200 (20 in this case) which move according to a global rotation movement R. The axes of the skirts 1, the axes of the punches 210, the axes of the matrices 240 and the axes of the tubes 5 remain parallel to each other and to the axis of rotation 11 corresponding to the common continuous circular movement R. The punches 210 can move axially towards the die 240 with the aim of molding the head or in the opposite direction to free the tube 5 thus produced. The die 240 can move radially to collect the preform 20 on a given diameter, different from that of the cylinder on which the trajectory of the punches remains. The means for loading the skirt 1 on the punch 210 is a loading fork 280, acting as a pusher on a cladder 120 integral with the loading mandrel 110 of the chain of loading mandrels 100. This fork 280 is activated so that it is displaced axially in the direction of the punch 210 while the die 240 is on a different diameter for collecting an extruded preform 20.

The punches 210 can be translated axially through the intermediary of cam followers 220, in this case rollers, located at the end of the punches opposite their heads 230, which follow a fixed cam path during the general rotation R, with a non-plane roller path, imposing displacement of the punch towards the die in the manufacturing zone of the tubes. The cam path is not shown directly in FIGS. 1 and 2 but it is materialized by the different positions of the ends of the punches 210. An elastic system—also not shown—makes it possible to maintain the rollers 220 in permanent contact with the cam path. The punch 210 is sufficiently long to be able to present, between the end of the skirt 1 almost entirely fitted and the roller 220 intended to follow the roller path, a cylindrical portion 215 which slides in a sleeve integral with the rotary machine 10 and which ensures firm maintenance of the punch parallel to the general rotation axis.

The matrices 240 follow the same general rotational movement R. They are supported by die carriers 250, which can be activated radially, and can collect the extruded preforms on a diameter different from that of the punches. For dimensional reasons, this diameter is greater than the diameter of the trajectory of the punches.

In the case shown in this example, the die 240 collects on the way a toric preform 20 produced by an extruder 30 whose die exit is oriented vertically. A perforation spindle 270 comprises an axial rod 271, which facilitates the centering of the toric preform in the die cavity 240 and helps to shape the distribution orifice made at the extreme end of the neck. The rod slides in the bore of the die and the friction of the rod in the bore is sufficient to maintain the spindle 270 integral with the die 240. A shallower bore is also made in the central end 235 of the head 230 of the punch 210. In this way, at the beginning of compression, the upper end of the rod 271 of the perforation spindle 270 enters inside this bore, making it possible to have, after molding, a neck with a distribution orifice with clean contours without residual traces.

When entering the manufacturing area, the die carriers are activated in such a way that they carry out a centripetal radial movement. The matrices are thus brought vertical to the punches. The compression is carried out by lowering the punch vertically in the direction of the die. The die carrier and die assembly advance under a ramp, which will serve as support all the way during compression.

A hole 260 of diameter greater than that of the skirts is made in the die carrier such that the skirt 1 can be fitted, with the aid of a loading fork 280, around a punch 210 while the die 240 collects the preform 20 in plastic material. In the loading zone, cladder 120 sliding freely around the loading mandrel 110 engages in the concave space of the loading fork 280.

A common circular movement R is imposed which makes the punch 210, the die carrier 250, the die 240 and the loading fork 280 pass successively into the skirt loading area (I), and then into the manufacturing area for tubes by molding the heads on the skirts (II), and then into the unloading area (III) for the tubes thus produced and then to return for a new cycle to the skirt loading area (I).

In the area for manufacturing tubes (II), several molding devices 200 each comprise a die 240 already provided with the extruded preform (not shown in the figures) and a punch 210 already equipped with a skirt 1 fitted around said punch, one of its ends extending slightly beyond the head 230 of said punch.

The head 230 of the punch 210 has a shape intended to define the internal surface of the head of the tube. The cavity of the die defines the external surface of the head. When the punch 210 and the die 240 are together, they define a molding cavity in which the extremity of the skirt is caught. The plastic material of the preform—under the effect of the approach of the punch 210 and the die 240—comes into contact with the end 3 of the skirt, which extends beyond the mandrel 210. The plastic materials of the head and the skirt are welded together intimately without any further supply of heat or material.

The chain 100 of transfer mandrels 110 and the chain 300 of cups 310 have a synchronized movement in the meaning that it is possible to debit a same flow of skirts and tubes without any accumulation or lack of supply of skirts (and thus tubes) crossing the second zone. The movement of the chain 100 of transfer mandrels 110, of the chain 300 of cups 310 and the rotary machine 10 is continuous in the meaning that at any moment, particularly during the loading of the skirts, during the compression of the head and during the unloading of the tubes, the skirts or the tubes are not held immobile. In the present case, the movement of the matrices 240 is also continuous and follows the general movement imposed by the rotary machine 10.

The second zone comprises a loading area (I) in which loading means 280 transfer the skirts 1 in continuous motion such that they leave the chain 100 with loading mandrels 110 and are fitted around the punches 210 actuated by the movement R imposed by the rotary machine 10.

The synchronization of the continuous motion of the punches 210 with that of the chain 100 is such that, in the loading area (I), the punches 210 and the skirts (1) follow parallel trajectories while their axes come substantially into coincidence. When they are substantially in coincidence, a loading fork 280 attached to the rotary machine 10, engages around a cladder 120, which is a ring sliding along the loading mandrel and on which the skirt 1 is set. It is activated vertically upwards and pushes the cladder 120 such that the skirt 1 follows a relative axial translation movement in the direction of the punch 210. The skirt 1 engages with little play around the punch by its first open end 2, said relative translation being stopped when said skirt is almost entirely fitted around the punch, its second end 3 intended to be welded to the head of the tube, extending beyond the head 230 of the punch.

The second zone also comprises an unloading area (III) in which, in continuous motion, the unloading means transfer the tubes fitted around the punches, actuated with the movement imposed by the rotary machine 10, to the chain 300 with cups 310. The loading forks 280, inactive in this area, engage around the reduced base 315 of the cups.

The synchronization of the continuous motion of the rotary machine 10 with that of the chain 300 with cups 310 is such that, in the unloading area (III), the punches 210 provided with tubes 5 and cups 310 follow parallel trajectories while their axes come substantially into coincidence. When they coincide substantially, air is blown under pressure into a channel formed in the punch 210, which has an outlet at a place in the head 230 of the punch 210. Excess pressure is exerted on the internal face of the head of the tube, sufficient to detach said tube head from the head 230 of the punch and then to eject the tube 5 axially in the direction of the cup 310.

The special embodiment shown in this example is a prototype, intended to verify the functioning of the different parts of the apparatus and in particular the rotary machine 10. This prototype has not been designed to achieve high manufacturing rates but described below are the different actions envisaged to reach rates of the order of 350 tubes per minute.

The rotary machine 10 of this example, provided with 20 punches that move around a diameter of 600 mm, turning at a speed of 6 revs/min makes it possible to produce 130 tubes per minute.

The preform, in PE.BD, is produced with the aid of a screw extruder with vertical exit oriented downwards. It has a toric shape of external diameter 20 mm and an internal diameter slightly greater than 10 mm. It weighs about 3 grams. It is deposited in the cavity of the die, which passes along a circular trajectory of diameter 700 mm to take up said preform on its way.

Maintenance under pressure of the molding tooling and the cooling time last for about 5 seconds.

In order to achieve higher rates, one can use several rotary machines of the same type as that described above, working in parallel. Once can also design a bigger rotary machine. For example, a rotary machine provided with 40 molding devices, the punches moving along a diameter of 1300 mm, making it possible to obtain a rate of 350 tubes per minute.

At this rate, the preform system in place must be replaced by a more complex system, for example a rotary machine involving 4 extruders on a diameter of 600 mm and turning at 20 rev/min, each extruder being able to be displaced radially, in such a way that the die and the die can advance one above the other at the same speed over a length of at least 50 mm. As an option, the third zone can also be equipped with a rotating machine provided with molding devices by compression similar to that described in the above example, but which would be devoted to over-molding by compression of stopper caps, according to the process described in the French patent application FR01-2574 filed by the applicant on Feb. 26, 2001 and containing examples concerning the neck-cap assembly, which are incorporated with reference to the present application.

A second chain with cups comes to collect the tubes 5 such that they are contained in the cups 310 so that the tubes are presented with their open end oriented upwards in the loading zone. A loading fork similar to the fork 280—but with different dimensions adapted to the tube—comes to take the tube by its shoulder and to give it a relative translational movement towards a punch similar to the punch 210 described above. The die, whose cavity defines the external surface of the stopper is fed with a preform with a simple nut-shape, taken on the way from the exit of an extrusion die. The approach of the punch and the die results in compression of the nut in plastic material between the cavity of the die and the external surface of the neck, which has just been molded. The cap is thus produced by over-molding, the surface of the neck participating in the definition of the molding cavity. The neck and the cap, provided for example with complementary screwing threads, short and shallow, offer the possibility of obtaining a stopper, which is particularly sealed and easy to unscrew.

Finally, since these over-molding operations of the stopper on the head do not require any intervention inside the tube, one does not need to envisage equipping the third zone but the second zone with a supplementary rotating machine. In such a case, the third transfer means would be a chain transporting the punches from the rotary machine manufacturing the tubes to that manufacturing the stoppers. This makes it possible to avoid unnecessary unloading operations, for transferring from one chain of cups to another chain of cups to turn over the tubes and then the loading of said tubes on a new chain with loading mandrels, the latter taking the tubes to the loading area of the rotary machine intended for over-molding the caps. On the other hand, the chain is longer and the number of punches propelled by the third means of transfer is higher.

EXAMPLE 2 (FIGS. 1 TO 8 AND FIGS. 9.1 AND 9.2; VARIANT FIG. 9.3)

The apparatus of this example has all the means described in the preceding prototype example apart from the tube manufacturing area (II) which has been slightly adapted to simplify the placing of the preform and thus to improve the manufacturing rates obtained.

In this example, the punch and the die have cavities such that the head 901 thus molded has a neck 903 whose upper end is surmounted with a cap 904 which has at least one transversal wall 905 comprising a sectile region 906 whose closed contour defines the required shape of the orifice and which is surrounded by two regions able to resist the mechanical effort needed to break said sectile region, one of them, 907, being intended to transmit said mechanical effort and the other 908 serving as support.

A part 909 of the cap 904 has the shape of an axial rod. Once the die is released, the tube thus formed and provided with said cap is integral with the punch 210 and moves in continuous motion on the rotary machine 10. It then suffices to place a single immobile finger with one extremity (represented by the dotted circle 910) located on the trajectory of the end of the rod 909. This finger is placed at a distance such that the sectile region 906 can be cooled down to a temperature close to 100° C. When the tube head 901 arrives in this position (it only takes a few seconds) the end of the rod is thus immobilized by the finger whereas the base of the rod carries on in its continuous movement integral with the movement of the rotary machine 10. As a result, a flexion is thus imposed on the rod 909, which is transmitted to the transversal wall 905 perpendicular to it. Under the effect of this flexion, the sectile region 906 breaks and the cap is ejected. The cap then follows a tangential trajectory, which ejects it outside the rotating machine zone, and it is recuperated in a container.

The rupture is neater the higher the running speed towards the immobile finger. We noted that very good results were obtained with a speed of the order of 0.8 m/sec.

The sectile region 906 is located on the transverse wall 905. It is notched with a notch with cross-section oriented following a slightly inclined direction relative to the axis of the neck. Preferably the notch has a V shape, the bisector of the V is slightly inclined relative to the axis 1000 of the neck and describes a cylinder or a cone with a center angle less than 90°. The angle of the V is comprised between 30° and 90°, typically between 40° and 50°. The V does not necessarily have symmetric branches around its bisector 963. Said bisector 963 makes an angle comprised between 0 and 45° with the axis of said neck. In this particular example, the sectile region is notched with a V shaped notch, with an internal branch 961 making an angle less than 5° with the axis 1000, an external branch 962 making an angle less than 55° with said axis and the bisector 963 of the V making an angle of 25° with the axis 1000 of the neck.

In this particular example, the head 901 is molded with high-density polyethylene. Its neck 903 has an external diameter of 11.5 mm and an average thickness of 1.5 mm (not counting the screwing thread). The transversal veil has, apart from the sectile region, a thickness of about a millimeter. The rod 909 has a height of 10 mm, while the residual thickness of the veil at the level of the sectile region is 0.3 mm.

Once the cap has been ejected, the neck 903 has an orifice without burrs or local deformation, of 7 mm in diameter.

In fact, the cap can take other shapes which cooperate with an immobile element, at least not following the general continuous motion, in such a way that the rupture is triggered by the difference in movement between this element and the third transfer element. Thus, FIG. 9.3 shows tubes 920 obtained with a head presenting an axisymmetric cap with a cross section in the shape of an upside-down T, such that the cap has an annular throat. After molding the head, the matrices are taken away and the tubes remain integral with the punches. The removal of the caps is carried out by simply trapping the ends of the T shaped caps, their annular throats being caught in a rail 940, immobile and non tangent to the trajectory of the tube heads resulting from the movement R of the rotating machine 10 and possible axial movement of the punches 210. After removing the caps, the tubes 5 have a head with a distribution orifice with a clean edge.

EXAMPLE 3 (FIGS. 1 TO 8 AND FIGS. 10 AND 11)

As in the preceding example, the apparatus has the same specifications as those of example 1. Only the tube manufacturing area (II) differs, re-organized to simplify the production and setting of the preform and thus to raise the manufacturing rate.

Using the immobile extruder 800, a thick cylindrical extrudate 805 is produced which is cut at a height such that the quantity of material required for making the tube head is obtained.

The cutting is carried out while running with the aid of a blade 821, integral with the fourth transfer means, and produced in an open receptacle 825. Typically, this blade has a V shape, the angle of the V preferably being comprised between 80° and 120° (in this particular case it is close to 100°). Such a shape for the blade makes it possible to cut the extrudate while still obtaining a toric shaped preform, which is hardly deformed. We will explain later that this preform is substantially toric in shape: there is no real axisymmetry as such because of the flattening due to the cutting but the oval remains little marked such that the preform made this way can easily fit around the protuberance of the punch intended to produce the interior of the neck. In order to improve this shape, it is possible to prevent the flattening effect by giving the tubular extrudate a cross-section, which is not circular but elliptic, the main axis of the ellipse being in the direction of displacement of the blade.

This blade also acts as receptacle 820 after cutting the extrudate, and receives the toric preform thus obtained during the time needed for transferring it to the compression molding tooling parts.

The turntable 810 acts as the fourth means of transfer and transfers in one continuous movement the intermediate receptacles 820 which receive the extruded preforms in continuous motion synchronized with the rotating machine 10 which acts as the third means of transfer and then one proceeds with setting them in place, through gravity or by means of an air jet, in the gap comprised between the molding tooling parts, that is to say in the cavity of the die or around a central protuberance of the punch.

Advantages all the shaping operations of the tube are carried out with mobile tooling, which makes it possible to manufacture tubes without any dead time and to exceed rates of 300 tubes per minute. These rates can rise considerably if the feeding of preforms can be supplied with a fourth or fifth transfer means.

the devices are simpler, less noisy, easier to design, more economical to maintain; this advantage is already appreciable with rates similar to those obtained with prior art installations.

greater flexibility in running the manufacturing process: in the processes of prior art, the manufacturing stages were carried out in discontinuous movement with stopping times imposed, and difficult to modulate. The installation working "step by step" had to be indexed, with heavy mechanical parts, and the time of static operations being inevitably multiples of the longest incompressible stopping time. Here, the movement is more fluid, and the efforts can be controlled better (cam profiles more flexible). Thus the mechanical constraints produced by the various problems linked to discontinuous step-by-step manufacturing are limited. The devices of the apparatus are organized mechanically as a whole, which improves their reliability.

| REFERENCE NUMBERS | |
|---|---|
| 1 | skirt |
| 2 | first end of skirt |
| 3 | second end of skirt, to be welded with the head of the tube |
| 5 | tube |
| 10 | third transfer means, rotary |
| 11 | rotation axis |
| 30 | device for manufacturing the preform and deposit of said preforms in the die cavities |
| 100 | first transfer means, chain of loading mandrels |
| 110 | loading mandrel |
| 200 | molding device |
| 210 | punch |
| 215 | sliding part of the punch |
| 220 | cam follower, roller |
| 230 | punch head |
| 235 | central end of the punch head |
| 240 | die |
| 250 | die carrier |
| 260 | hole made in the die carrier |
| 270 | perforation spindle |
| 271 | axial rod of the perforation spindle |
| 280 | loading means, loading fork |
| 300 | second transfer means, chain of cups |
| 310 | cup |
| 315 | reduced base of the cup |
| 800 | extruder |
| 805 | extrudate; thick tube |
| 810 | turntable |
| 820 | cutter-receptacle |
| 825 | V shaped blade |
| 829 | fixation collar of the cutter-receptacle on the turntable |
| 901 | tube head |
| 902 | shoulder |
| 903 | neck |
| 904 | cap |
| 905 | transversal veil |
| 906 | sectile region |
| 907 | region for transmission of the rupture effect of the sectile zone; transversal veil |
| 908 | support region, top part of the neck |
| 909 | rod shaped part of the cap |
| 910 | immobile finger |
| 920 | tube with a head provided with a cap in the shape of an upside-down T |
| 940 | rail trapping the caps in the shape of an upside-down T |
| 961 | internal branch of the V notch |
| 962 | external branch of the V notch |
| 963 | V shaped bisector notch |
| 1000 | neck axis |
| D | displacement direction of the head 901 |
| R | direction of rotation |
| I | skirt loading area |
| II | tube manufacturing area |
| III | tube unloading area |

The invention claimed is:

1. Process for manufacturing flexible tubes having a skirt and a head provided with a neck and a shoulder connecting the neck to the skirt, wherein the skirt, head, and shoulder are of a plastic material, the method comprising the following steps:

a first step wherein skirts are driven by a continuous motion using a first transfer means;

a second step wherein the skirts are loaded using loading means onto punches associated with a third transfer means driven by a continuous motion synchronized with the first transfer means, wherein one of the ends of the skirts extends slightly beyond the punches;

a third step wherein the flexible tubes are made by moulding the heads by welding to one end of the skirts, wherein the heads are obtained by compression moulding of preforms by moving the punches fitted with the skirts and matrices closer to each other, wherein the punches and the matrices defining when they are placed side by side moulding cavities in which the ends of the skirts are trapped, wherein the punches and the matrices are driven by a continuous overall motion corresponding to the motion of the third transfer means; and a fourth step wherein the tubes are unloaded using unloading means onto a second transfer means driven by a continuous motion synchronised with the third transfer means, wherein the preforms are obtained by extrusion of a plastic material then taken off and deposited before compression using a fourth transfer means driven by a continuous motion synchronised with the third transfer means in the space between the matrices and the punches in such a way that during compression the plastic material of the preforms comes into contact with the end of the skirts and that the plastic material of the preforms and of the skirts are closely welded to each other without any further addition of heat or material, and wherein the extrusion is carried out with an immobile extruder, and wherein the fourth transfer means transfers in continuous motion intermediary receptacles that collect the preforms wherein the extrudate is cut as it exits from the extruder by blades to obtain the said preforms, said blades being integral with said intermediary receptacles that collect the preforms.

2. Process for manufacturing flexible tubes according to claim 1 wherein an extrudate in the shape of a thick cylindrical tube is extruded and is then sheared in such a way as to form preforms having a substantially toric shape.

3. Process for manufacturing flexible tubes according to claim 1 wherein the preforms are deposited using a jet of air and optionally further by gravity either in the cavities or on the ends of the punches.

4. Process for manufacturing flexible tubes according to claim 1 wherein the cavities defined by the punches and the matrices are designed in such a way that the tube heads thus moulded necks the upper ends of which are topped by caps which each have at least one transverse wall which includes a tear zone the outline of which delimits the desired shape of an orifice and which is surrounded by two regions able to resist the mechanical stress necessary to break the tear zone, one region transmitting the mechanical stress and the other region acting as a support, and wherein, after displacement of the punches from the matrices the caps are removed by applying mechanical stress onto one part of the caps separated from the tear zone by the region able to transmit the mechanical stress, the result of applying the mechanical stress being to break the tear zone and to obtain the orifice.

5. Process for manufacturing flexible tubes according to claim 4 wherein the tear zone is broken during cooling following moulding, as soon as the plastic material reaches at the level of the tear zone a temperature slightly below its vitreous transition temperature.

6. Process for manufacturing flexible tubes according to claim 4 wherein the cavities are designed in such a way that the caps obtained have a shape allowing engagement with a component which does not follow the continuous overall motion of the third transfer means, in such a way that breaking is triggered by the difference in motion between this component and the third transfer means.

7. Process for manufacturing according to claim 1 wherein the preforms are taken off by receptacles, wherein the receptacles have blades, and wherein the blades are transverse walls of the receptacles.

8. Process for manufacturing according to claim 1 wherein the extrudate is taken off by receptacles, wherein the receptacles have a longitudinal wall and a transverse wall, both of them being open in such a manner that the extrudate is engaged in the receptacle while it is cut by the transverse wall acting as a blade.

9. Process for manufacturing according to claim 8 wherein the blade is V-shaped, the opening resulting from the V-shape corresponding to the opening of the longitudinal wall.

10. Process for manufacturing assemblies of pieces made of plastic materials, the process comprising the following steps:
    a first step wherein the assembly pieces, already made, are set in continuous motion using a first transfer means;
    a second step wherein moulding toolings having two parts are loaded using loading means onto the assembly pieces wherein portions of the assembly pieces project beyond the moulding toolings in such a way that, when the moulding tooling parts are placed side by side, they define a moulding cavity in which the projecting portions of the assembly pieces are trapped, the moulding tooling being associated with a third transfer means driven by a continuous motion synchronised with the first transfer means,
    a third step wherein the assemblies are made by moulding intermediate pieces of plastic material in which the projecting portions of the assembly pieces are welded or trapped by the plastic material of the intermediate pieces, the intermediate pieces being obtained by compression moulding of preforms, by bringing the moulding tooling parts closer together, the moulding tooling parts being driven by an overall continuous motion corresponding to the motion of the third transfer means;
    a fourth step wherein the assemblies are unloaded using unloading means onto a second transfer means driven by a continuous motion synchronised with the third transfer means,
wherein the preforms are obtained by extrusion and then taken off and deposited before compression, using a fourth transfer means driven by a continuous motion synchronized with the third transfer means, in the gaps between the moulding tooling parts in such a way that during compression the projecting portions of the assembly parts are moulded autogenously or trapped by the plastic material of the intermediate pieces, wherein the extrusion is carried out with an immobile extruder and wherein the fourth transfer means transfers in continuous motion intermediary receptacles which collect the extruded preforms and wherein the extrudate is cut as it exits from the extruder by blades which are integral with the intermediate receptacles.

11. Process for manufacturing assemblies of pieces in plastic materials according to claim 10 modified in that the moulding toolings are configuration toolings and in that in the third step, the configuration toolings give shape to intermediate pieces of an adhesive polymer material which adhere to the assembly pieces already made.

* * * * *